(12) United States Patent  (10) Patent No.: US 10,981,503 B2
Huang et al.  (45) Date of Patent: Apr. 20, 2021

(54) WARNING SYSTEM IMPLEMENTED IN A VEHICLE AND METHOD THEREOF

(71) Applicants: Mindtronic AI Co., Ltd., Grand Cayman (KY); Shanghai XPT Technology Limited, Shanghai (CN)

(72) Inventors: Mu-Jen Huang, Taipei (TW); Ya-Li Tai, Taoyuan (TW); Yu-Sian Jiang, Kaohsiung (TW)

(73) Assignees: Mindtronic AI Co., Ltd., Grand Cayman (KY); Shanghai XPT Technology Limited, Shanghai (CN)

( * ) Notice: Subject to any disclaimer, the term of this patent is extended or adjusted under 35 U.S.C. 154(b) by 0 days.

(21) Appl. No.: 16/244,103

(22) Filed: Jan. 10, 2019

(65) Prior Publication Data

US 2019/0210522 A1   Jul. 11, 2019

(30) Foreign Application Priority Data

Jan. 11, 2018 (CN) .......................... 201810027834.X
Jan. 11, 2018 (CN) .......................... 201820046855.1

(51) Int. Cl.
*B60Q 9/00* (2006.01)
*G08G 1/052* (2006.01)
*G08G 1/0962* (2006.01)
*G08G 1/16* (2006.01)

(52) U.S. Cl.
CPC ............. *B60Q 9/008* (2013.01); *G08G 1/052* (2013.01); *G08G 1/09626* (2013.01); *G08G 1/166* (2013.01)

(58) Field of Classification Search
CPC .. B60Q 9/008; B60Q 1/2665; G08G 1/09626; G08G 1/166; G08G 1/052; B60K 2370/179; B60K 35/00
See application file for complete search history.

(56) References Cited

U.S. PATENT DOCUMENTS 4,626,850 A * 12/1986 Chey ................... G08G 1/166
                                                340/903
6,087,961 A *  7/2000 Markow ............. G08G 1/0965
                                                340/902
8,676,431 B1 *  3/2014 Mariet ................. G08G 1/166
                                                 701/28

* cited by examiner

*Primary Examiner* — Brian Wilson
(74) *Attorney, Agent, or Firm* — Winston Hsu

(57) ABSTRACT

A warning system implemented in a vehicle includes a proximity warning module and a display module. The proximity warning module is configured to detect an object approaching the vehicle and generate a proximity warning signal. The display module is configured to display a signal in the side area when the proximity warning signal is generated, where a position of the signal is determined based on a relative direction of the object to the vehicle.

10 Claims, 16 Drawing Sheets

|  |  | level-1 | level-2 | level-3 |
|---|---|---|---|---|
| t< 3S | d>R | 0 | 0 | 1 |
| | 0<d≤R | 0 | 0 | 1 |
| 3S≤t< 5S | d>R | 0 | 1 | 0 |
| | 0<d≤R | 0 | 0 | 1 |
| 5S≤t< 7S | d>R | 1 | 0 | 0 |
| | 0<d≤R | 0 | 1 | 0 |
| t≥7S | d>R | 0 | 0 | 0 |
| | 0<d≤R | 1 | 0 | 0 |

FIG. 10

WARNING SYSTEM IMPLEMENTED IN A VEHICLE AND METHOD THEREOF

BACKGROUND OF THE INVENTION

1. Field of the Invention

The present invention relates to a warning system implemented in a vehicle and method thereof, and more particularly, to a warning system that alerts drivers as to road conditions and driving conditions and method thereof.

2. Description of the Prior Art

Traffic accidents are mostly caused by speeding or lane changing. A conventional car speeding warning system adopts satellite navigation devices to calculate the speed of a vehicle and issues a warning signal if the speed exceeds the limit in one particular road section. Recently, advanced driving assistant systems (ADAS) are emerged to provide various warning systems including lane departure warning systems (LDWS), blind-spot detection systems (BSDS), lane change warning systems (LCWS) and so on. Those systems are used to assist drivers. Although these systems may be helpful, they still fail to consider the way those warning signals are given.

SUMMARY OF THE INVENTION

According to one aspect of the present disclosure, a warning system implemented in a vehicle is provided. The warning system includes a proximity warning module and a display module. The proximity warning module is configured to detect at least one object approaching the vehicle and generate a proximity warning signal, where the proximity warning signal comprises a relative direction of the at least one object to the vehicle. The display module is configured to display a signal in a side area of the display module when the proximity warning signal is generated. The position of the signal is determined based on the relative direction of the at least one object to the vehicle.

According to another aspect of the present disclosure, a warning system implemented in a vehicle is provided. The warning system includes an overspeed warning module and a display module. The overspeed warning module is configured to generate an overspeed warning signal when a speed of the vehicle exceeds a speed limit. The display module is configured to display an alerting when the overspeed warning signal is generated.

According to yet another aspect of the present disclosure, a method for providing warnings is provided. The method includes the following actions. At least one object approaching the vehicle is detected, and raw sensing data is generated, where the raw sensing data includes a relative direction and a relative distance of the at least one object to the vehicle. A proximity warning signal is generated according to the raw sensing data, and the proximity warning signal comprises a relative direction of the at least one object to the vehicle. A signal is displayed in a side area of a display module when the proximity warning signal is generated, and a position of the signal is determined based on the relative direction of the at least one object to the vehicle.

According to yet another aspect of the present disclosure, a method for providing warnings is provided. The method includes the following actions. A speed of a vehicle is obtained. A speed limit corresponding to a road section is retrieved. An overspeed warning signal is generated when the speed of the vehicle exceeds the speed limit. An alerting signal is displayed when the overspeed warning signal is generated.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 10 is a schematic diagram of a truth table including multiple proximity levels, a warning threshold distance, and time of arrival thresholds.

DETAILED DESCRIPTION

In the following detailed description of the embodiments, reference is made to the accompanying drawings which form a part hereof, and in which is shown by way of illustration specific embodiments in which the invention may be practiced. In this regard, a directional terminology, such as "top," "bottom," "front", "back", "left", "right", is used with reference to the direction of the Figure(s) being described. However, the components of the present disclosure may be positioned in several different directions. As such, the directional terminology is used for illustration purposes only. On the other hand, the drawings are only schematic, and the sizes of components may be exaggerated for clarity. It is to be understood that other embodiments may be utilized, and structural changes may be made without departing from the scope of the present disclosure. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

The present disclosure provides a system and a method to alert drivers in a less distracted way.

Figure 1:
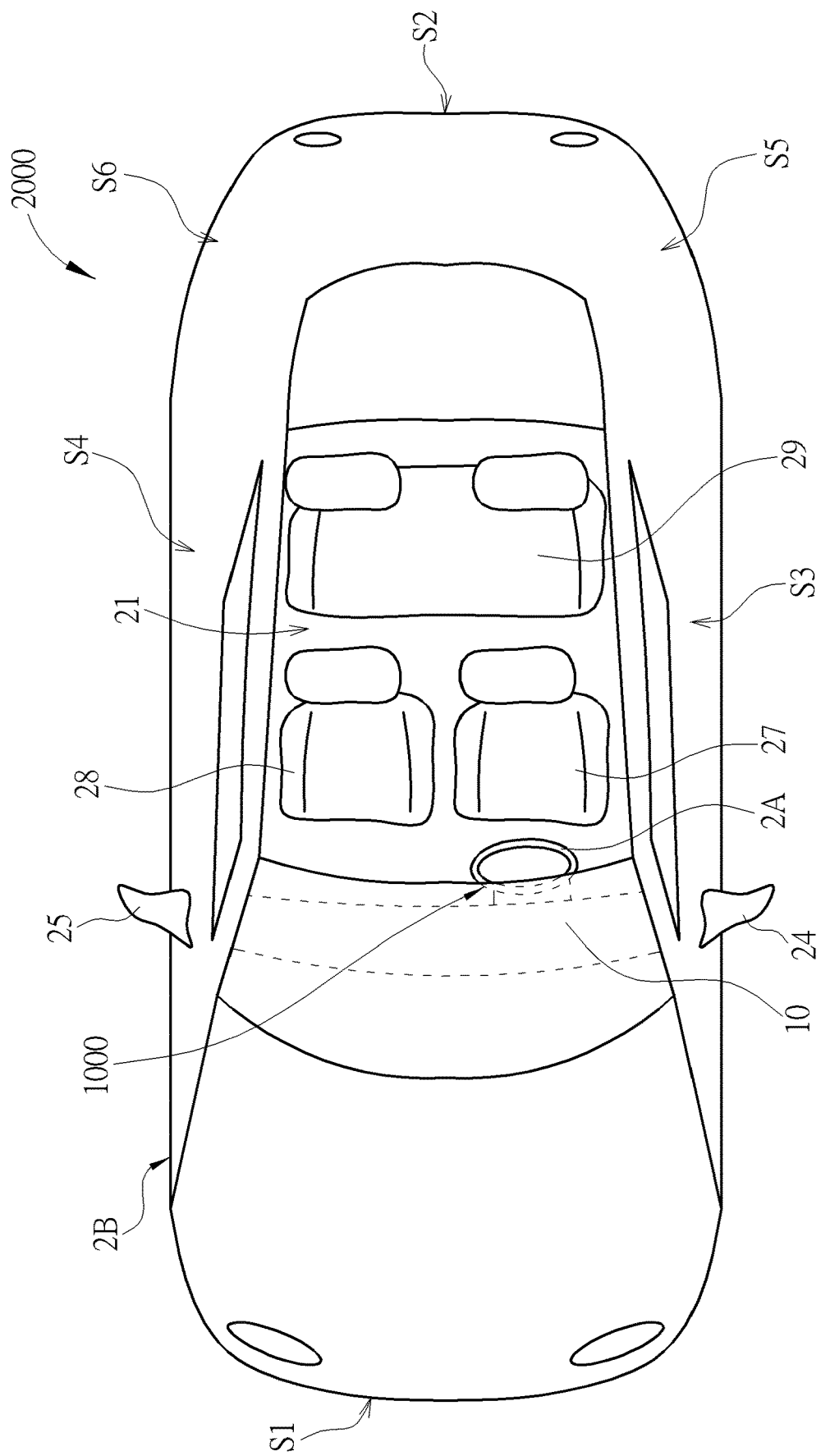
FIG. 1 is a schematic diagram of a warning system implemented in a vehicle according to an embodiment of the present disclosure.

FIG. 1 is a schematic diagram of a warning system 1000 implemented in a vehicle 2000 according to an embodiment of the present disclosure. In this implementation, the vehicle 2000 is a left-hand drive car, i.e., the driver's seat 27 is on the left-hand side of the vehicle 2000. In some implementations, the vehicle 2000 may be a right-hand drive car, and the driver's seat is on the right-hand side of the vehicle 2000. As shown in FIG. 1, a vehicle 2000 includes a vehicle body 2B. The vehicle body 2B has a front side S1, a rear side S2, a left side S3 and a right side S4. The "front" and "rear" here are defined based on "forward" and "reverse" of the movement of the vehicle 2000. Furthermore, the car body 2B further includes a left-rear side S5 and a right-rear side S6. The left-rear side S5 adjoins the left side S3 and the rear side S2. The right-rear side S6 adjoins the right side S4 and the rear side S2.

The vehicle 2000 further includes a cabin 21 confined by the vehicle body 2B. The cabin 21 equips with a driver's seat 27, a passenger seat 28, and a back seat 29. The driver's seat 27 is positioned in-between the front side S1 and the rear side S2. The passenger seat 28 is adjacent to the driver's seat 27. The back seat 29 is located behind the driver's seat 27 and the passenger seat 28, and before the rear side S2. When a driver is seated on the driver's seat 27 and faces forward, the left side S3 is on the driver's left-hand side, and the right side S4 is on the driver's right-hand side. The vehicle 2000 further includes steering wheel 2A placed right in front of the driver's seat 27.

Figure 2:
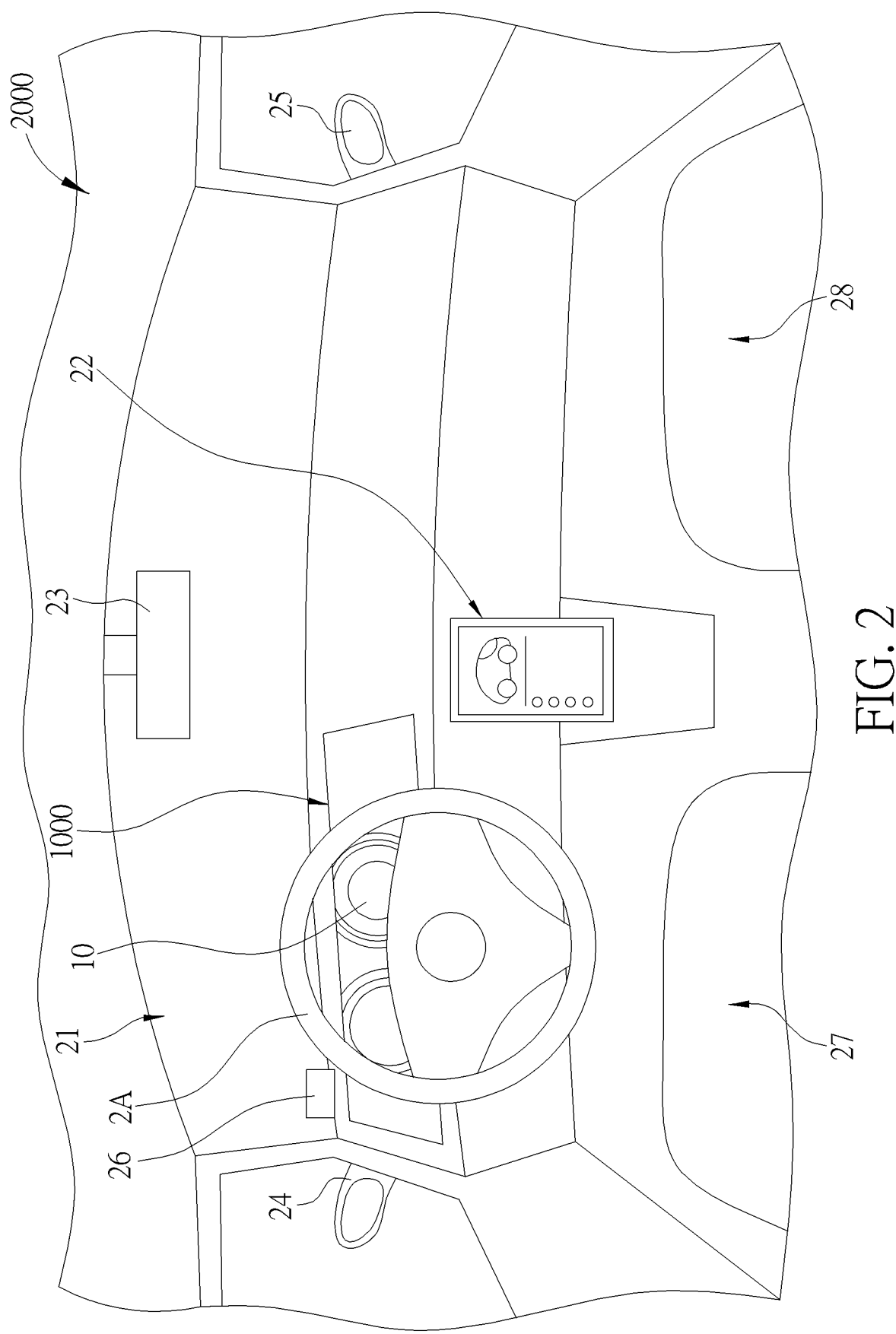
FIG. 2 is a schematic diagram of a front interior of the vehicle as shown in FIG. 1.

FIG. 2 is a schematic diagram of a front interior of the vehicle 2000. The vehicle 2000 further includes a vehicle instrument cluster 10, a central console panel 22, a center rear-view mirror 23, a left rear-view mirror 24, a right rear-view mirror 25 and a head-up display (HUD) 26. The central console panel 22 and the center rear-view mirror 23 are disposed in the cabin 21. The left rear-view mirror 24 and the right rear-view mirror 25 are external to the cabin 21 and located on the left and the right sides of the vehicle body 2B, respectively. The head-up display 26 is disposed in the cabin 21. As shown in FIG. 2, the warning system 1000 is disposed on the vehicle 2000. Specifically, the warning system 1000 includes a display module for displaying a signal for notifying the driver in response to a warning signal. The display module may be integrated with the central console panel 22, the center rear-view mirror 23, the left rear-view mirror 24, the right rear-view mirror 25, the head-up display 26, or any combination of the above.

Figure 14:
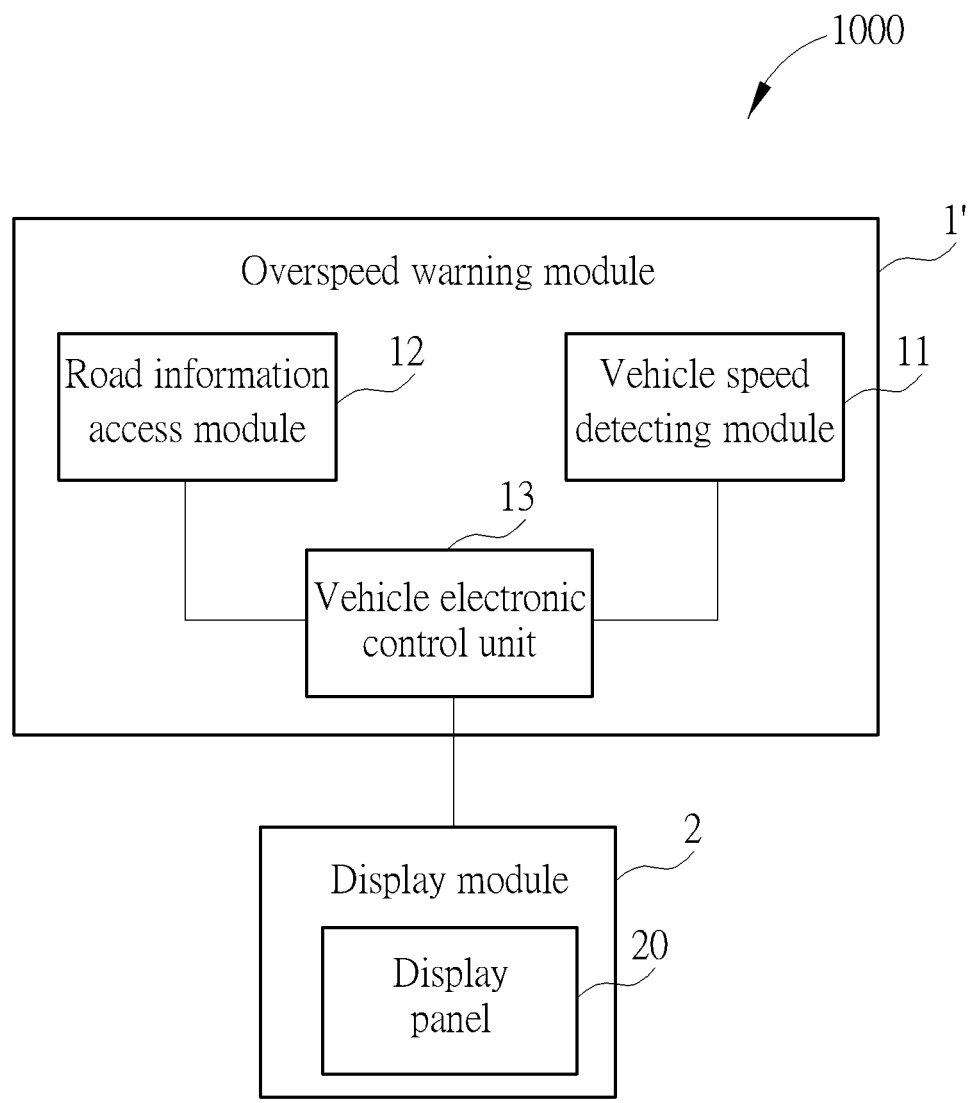
FIG. 14 is a block diagram of a warning system with a high-speed alert feature according to an embodiment of the present disclosure.

FIG. 14 is a block diagram of a warning system 1000 according to an embodiment of the present disclosure. In this implementation, the warning system 1000 provides a high-speed alert feature. As shown in FIG. 14, the warning system 1000 includes an overspeed warning module 1' and a display module 2. In one embodiment, the overspeed warning module 1' may be an intelligent hardware device, such as a central processing unit (CPU), a microcontroller, or an ASIC. The overspeed warning module 1' is configured to generate an overspeed warning signal when the speed of the vehicle 2000 exceeds a limit. The display module 2 is coupled to the overspeed warning module 1'. The display module 2 is configured to display an alerting signal when the overspeed warning signal is generated.

In one embodiment, the alerting signal may be performed through color changes, adjustments of brightness, changes of shape and/or a flashing indicator.

As shown in FIG. 14, the display module 2 includes a display panel 20. In one embodiment, the display panel 20 is a liquid crystal display (LCD) panel. In some other embodiments, the display panel 20 may be a light emitting diode (LED) panel, or an organic light emitting diode (OLED) panel and so on.

Figure 3:
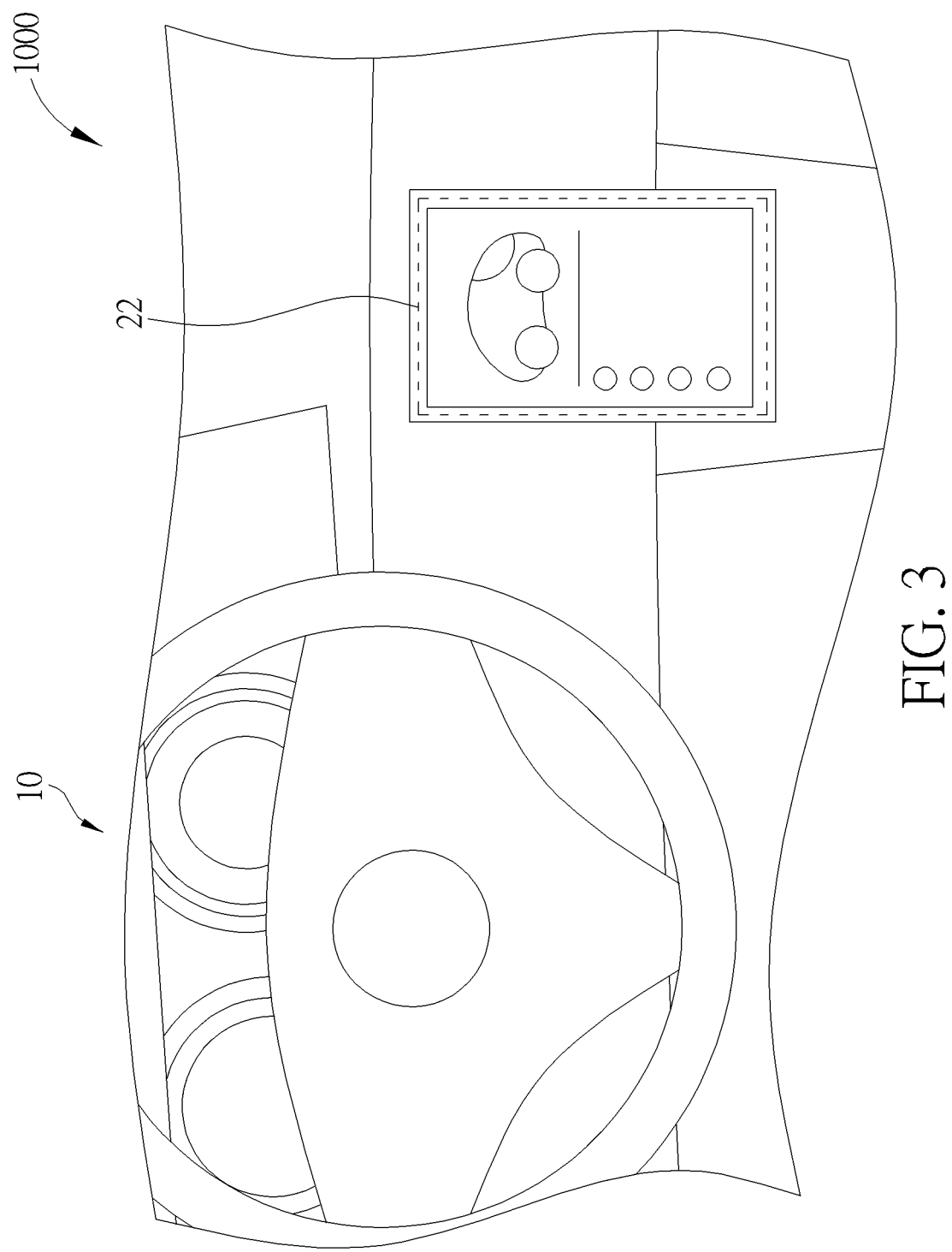
FIG. 3 is a schematic diagram of a display module of the warning system disposed on a vehicle instrument cluster or a central console panel according to an embodiment of the present disclosure.

In the present disclosure, the display module 2 may be disposed on the vehicle instrument cluster 10 or the central console panel 22 of the vehicle 2000. FIG. 3 is a schematic diagram showing an implementation where the display module 2 is integrated with a vehicle instrument cluster 10.

Figure 4:
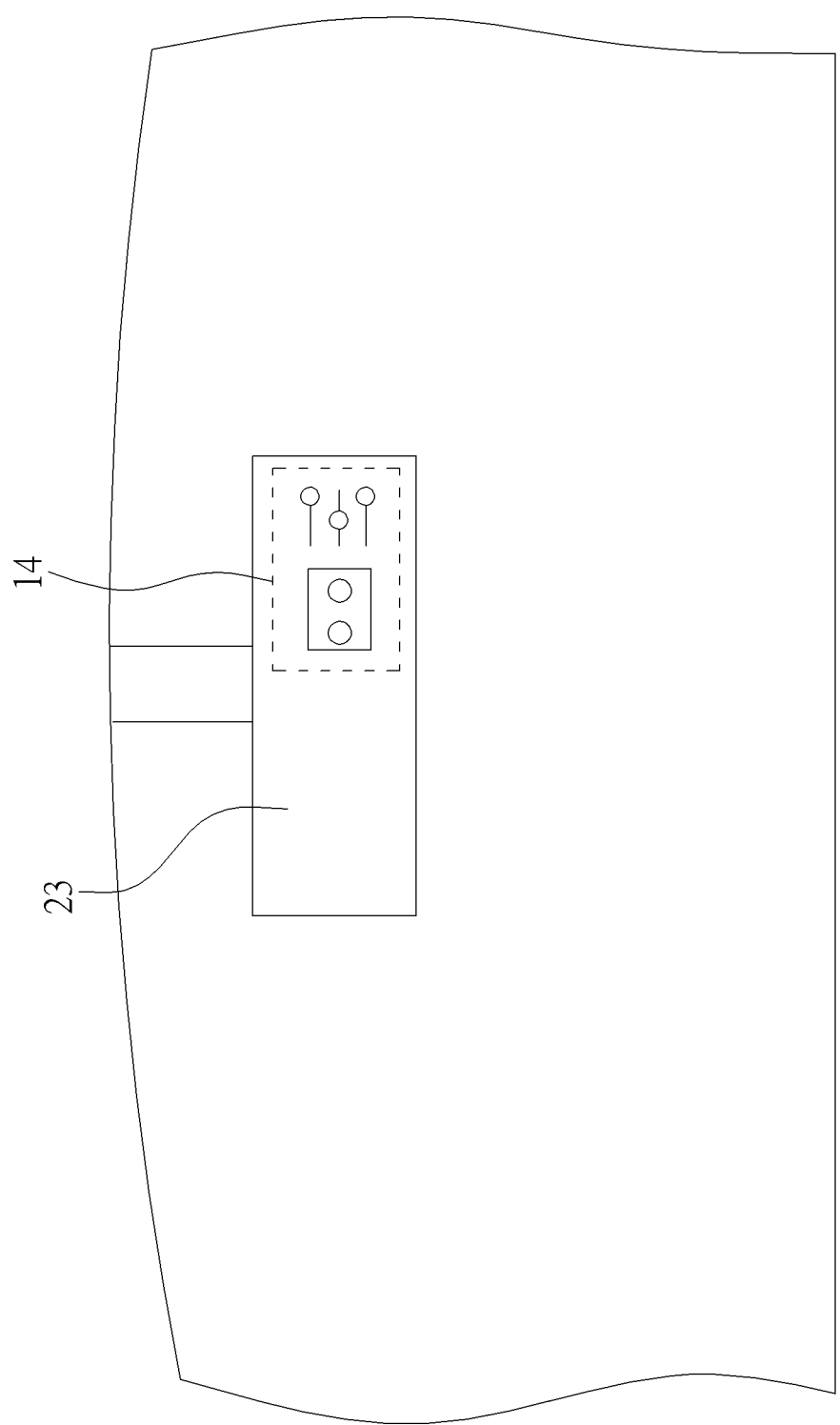
FIG. 4 is a schematic diagram of a display module of the warning system disposed on a center rear-view mirror according to an embodiment of the present disclosure.

FIG. 4 is a schematic diagram illustrating an integration of the display module 2 with the center rear-view mirror 23 of the vehicle 2000 according to an embodiment of the present disclosure. In this implementation, the display module 2 is implemented in a center rear-view display 14 of the center rear-view mirror 23.

Figure 5:
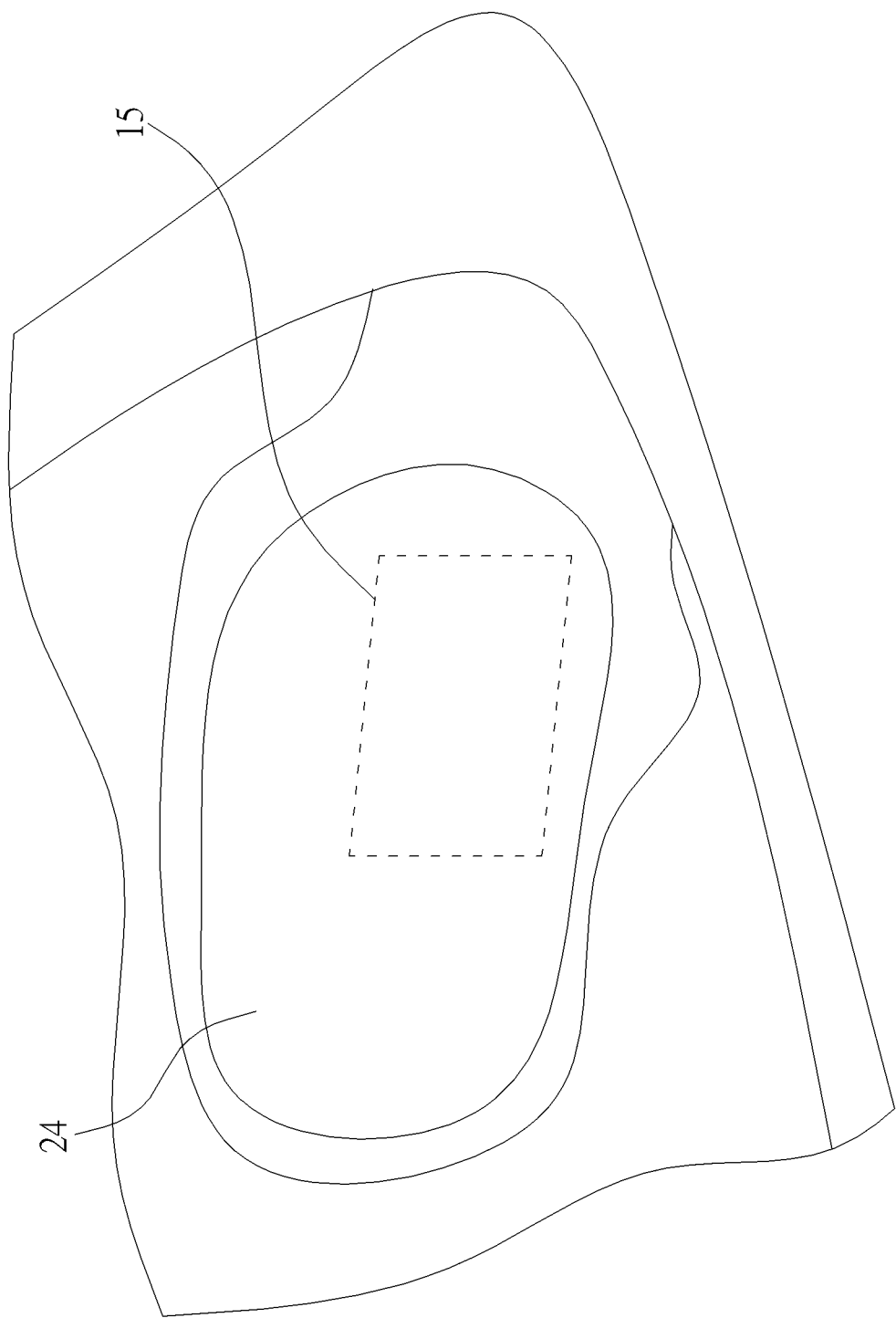
FIG. 5 is a schematic diagram of a display module of the warning system disposed on a left rear-view mirror according to an embodiment of the present disclosure.

FIG. 5 is a schematic diagram showing the display module 2 is integrated with the left rear-view mirror 24 of the vehicle 2000 according to an embodiment of the present disclosure. In this implementation, the display module 2 is implemented in a left rear-view display 15 of the left rear-view mirror 24.

Figure 6:
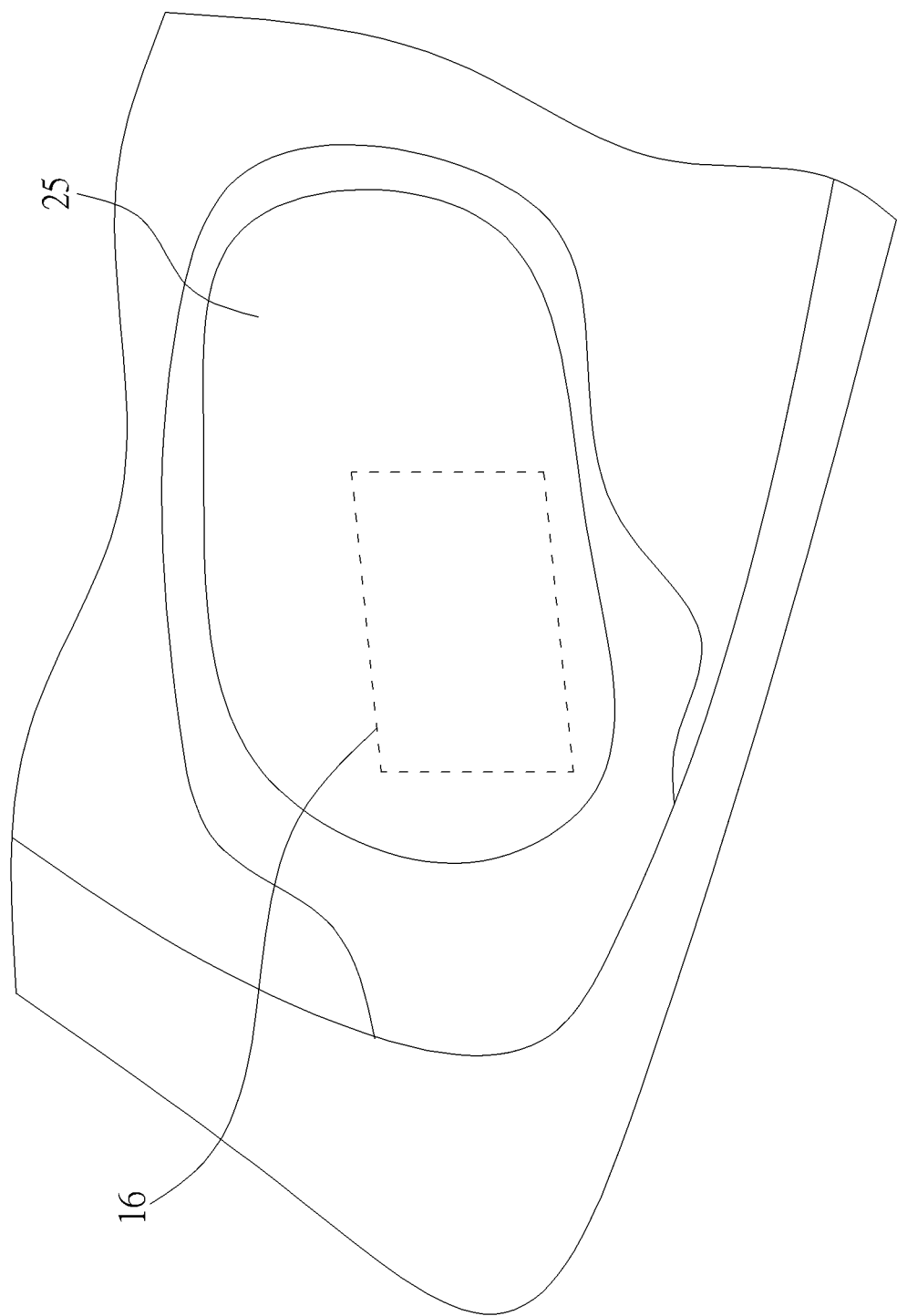
FIG. 6 is a schematic diagram of a display module of the warning system disposed on a right rear-view mirror according to an embodiment of the present disclosure.

FIG. 6 is a schematic diagram demonstrating the display module 2 disposed on the right rear-view mirror 25 of the vehicle 2000 according to an embodiment of the present disclosure. In this implementation, the display module 2 is implemented in a right rear-view display 16 of the right rear-view mirror 25.

Figure 7:
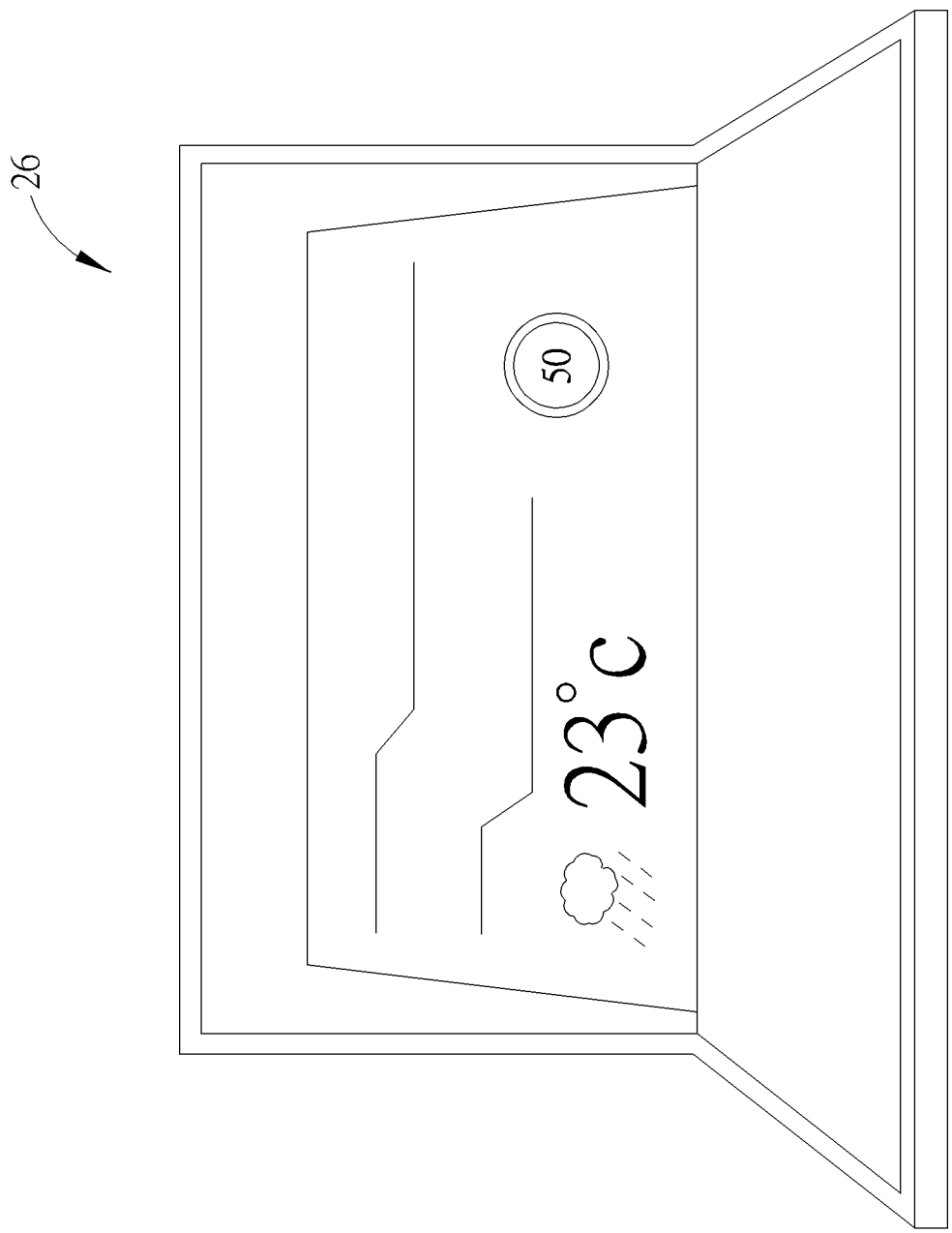
FIG. 7 is a schematic diagram of a display module of the warning system disposed on a head-up display (HUD) according to an embodiment of the present disclosure.

FIG. 7 is a schematic diagram illustrating another integration of the display module 2 with the head-up display 26 of the vehicle 2000 according to an embodiment of the present disclosure. In this implementation, the display module 2 is implemented in the head-up display 26.

Aside from the foregoing, in some other implementations, the display module 2 of the warning system 1000 may alternatively be implemented on other devices capable of displaying.

It should note that in the present disclosure, an alerting signal is given is a less distracted way. That is, the alerting signal may be a flashing and/or a flashing of the speedometer to draw the driver's immediate attention. Additionally, the place chosen to display alerting signals is also critical. In the present disclosure, alerting signals are display on the area perceptible by the driver without changing his/her eyesight. The detail will be discussed in the following paragraphs.

Figure 13:
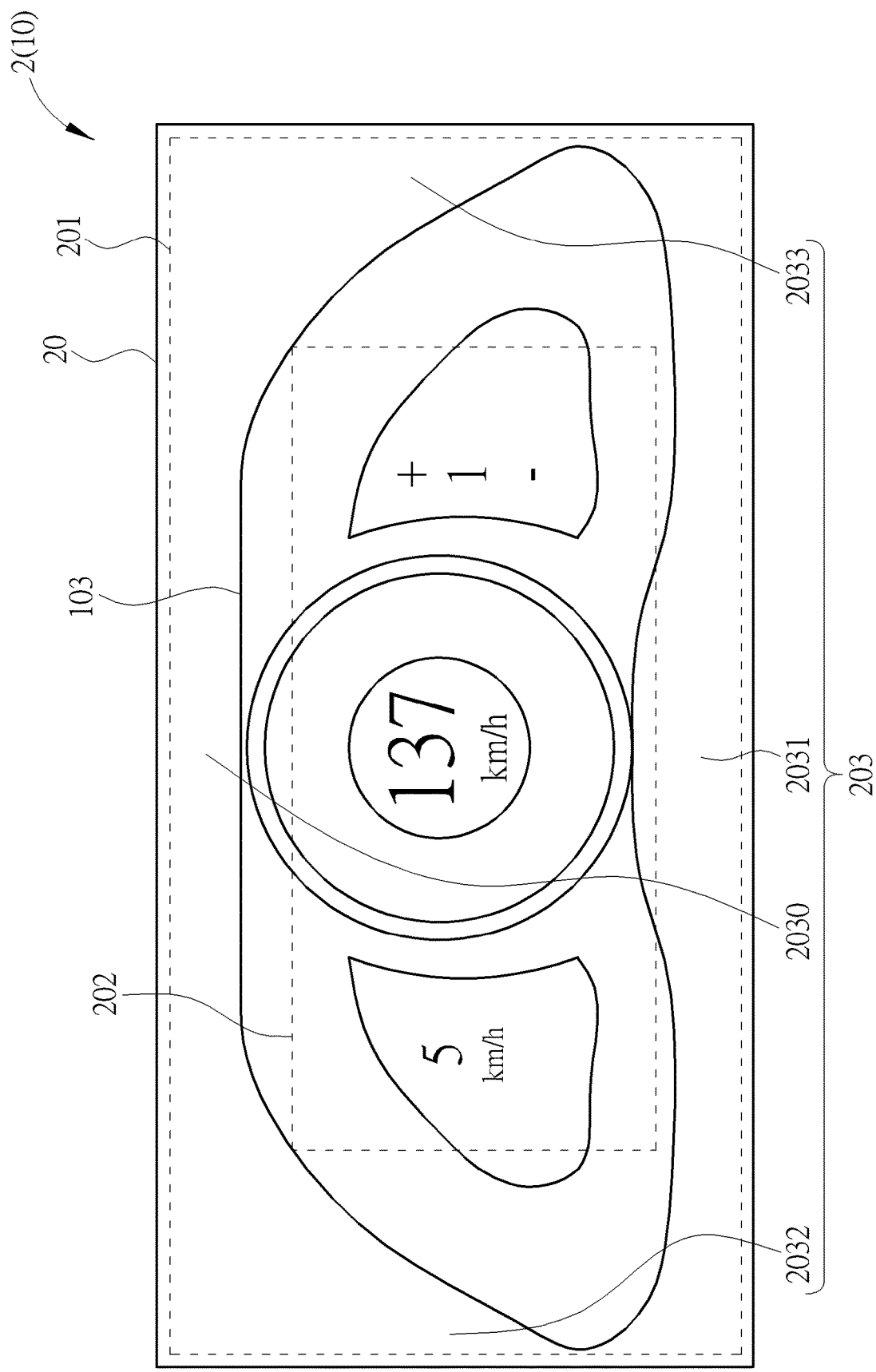
FIG. 13 is a schematic diagram of a display module (e.g., implemented in the vehicle instrument cluster) according to an embodiment of the present disclosure.

FIG. 13 is a schematic diagram of a display module 2 (10) which is integrated with the vehicle instrument cluster 10 having a display panel 20 according to an embodiment of the present disclosure. Firstly, skilled persons should understand that a vehicle instrument cluster is provided for the display of vehicle information. The vehicle information may include, but not limited to a speedometer, a fuel gauge, a tachometer, and an odometer. The information is placed right in the middle of the display panel for a driver's clear view. As shown in FIG. 13, the display panel 20 includes an active display area 201 for displaying. In the present disclosure, the active display area 201 is divided into two sections, a central area 202 and a side area 203. In one embodiment, the size of side area 203 is rather small than the size of the central area 202. The central area 202 is provided for the display of vehicle information as mentioned above. Apart from that, the present disclosure further provides the side area 203 for the display of alerting signals. The side area 203 is an outer area of the display panel 20 and perceptible by the driver. The side area 203 may further divided into an upper display area 2030, a lower display area 2031, a left display area 2032 and a right display area 2033. As depicted in FIG. 13, the alerting signals will be given within the side area 203. Thus, when an alerting signal is flashing on the display panel 20, the driver will notice it without turning his/her eyesight away.

Figure 16:
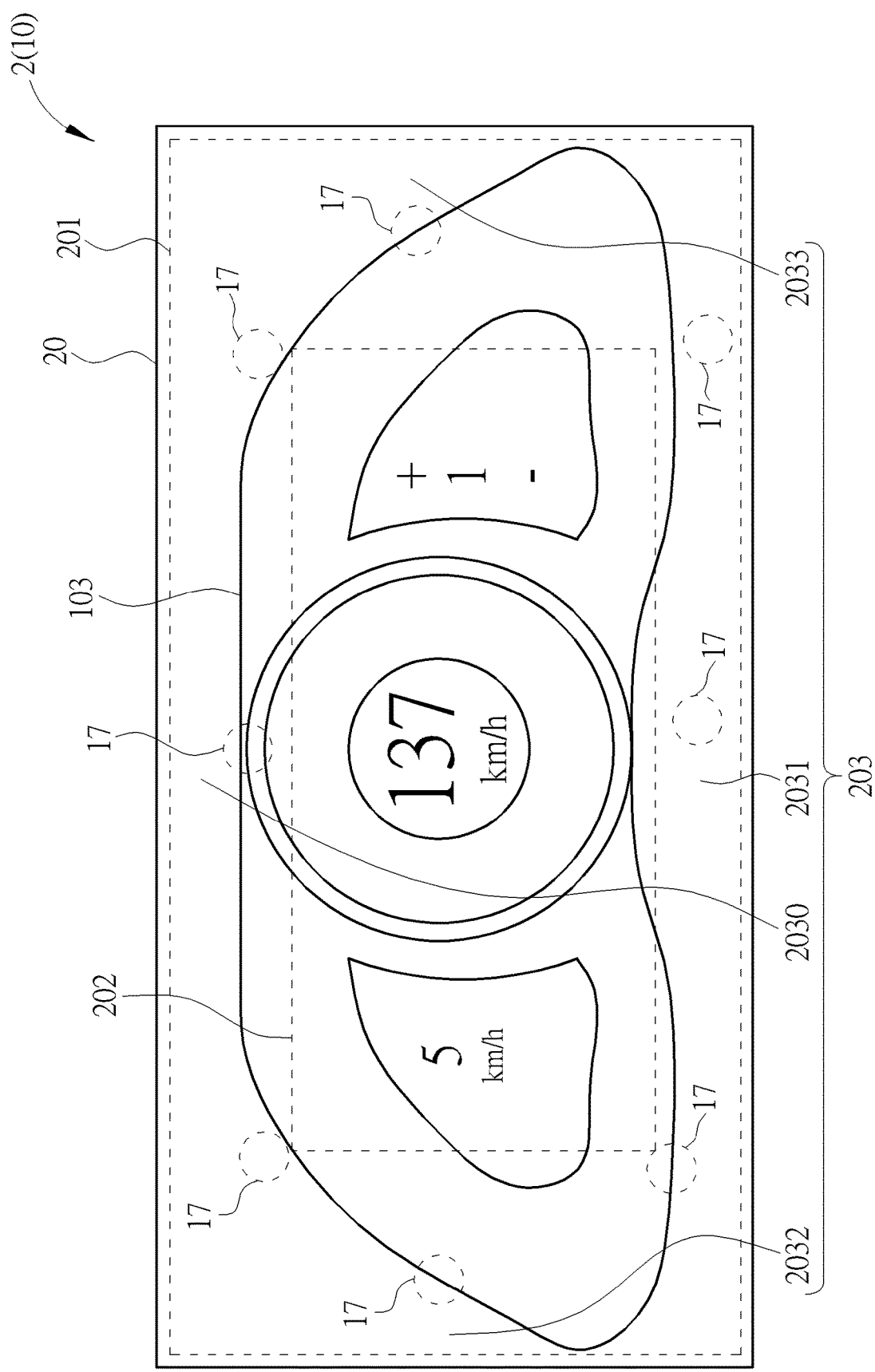
FIG. 16 is a schematic diagram of a display module (e.g., implemented in the vehicle instrument cluster) according to another embodiment of the present disclosure.

In another embodiment, alerting signals may be achieved through arrangements of light emitters. For example, as shown in FIG. 16, the display module 2 further includes numbers of light emitting units 17 arranged within the side area 203 of the display panel 20. The light emitting units 17 generate alerting signals in the place perceptible by the driver to draw immediate attention. Since the driver can percept the signal without changing the eyesight, it is less distracted. The light emitting units 17 in FIG. 16 are arranged in a ring, but it is a mere example and other shapes such as a rectangle would also work. Additionally, although the light emitting units 17 are placed within the display panel 20, they may also be arranged alongside the boundary of the vehicle instrument cluster 10, or any similar places where the same purpose can be achieved.

Please refer back to FIG. 14. As shown, the overspeed warning module 1' includes a vehicle speed detecting module 11, a road information access module 12 and a vehicle electronic control unit 13. The vehicle electronic control unit 13 is coupled to the vehicle speed detecting module 11, the road information access module 12 and the display module 2. The vehicle speed detecting module 11 is configured to obtain the speed of the vehicle 2000. The road information access module 12 is configured to access a speed limit in any given road section. The vehicle electronic control unit 13 of the overspeed warning module 1' is configured to generate the overspeed warning signal when the vehicle speed exceeds the speed limit.

Figure 15:
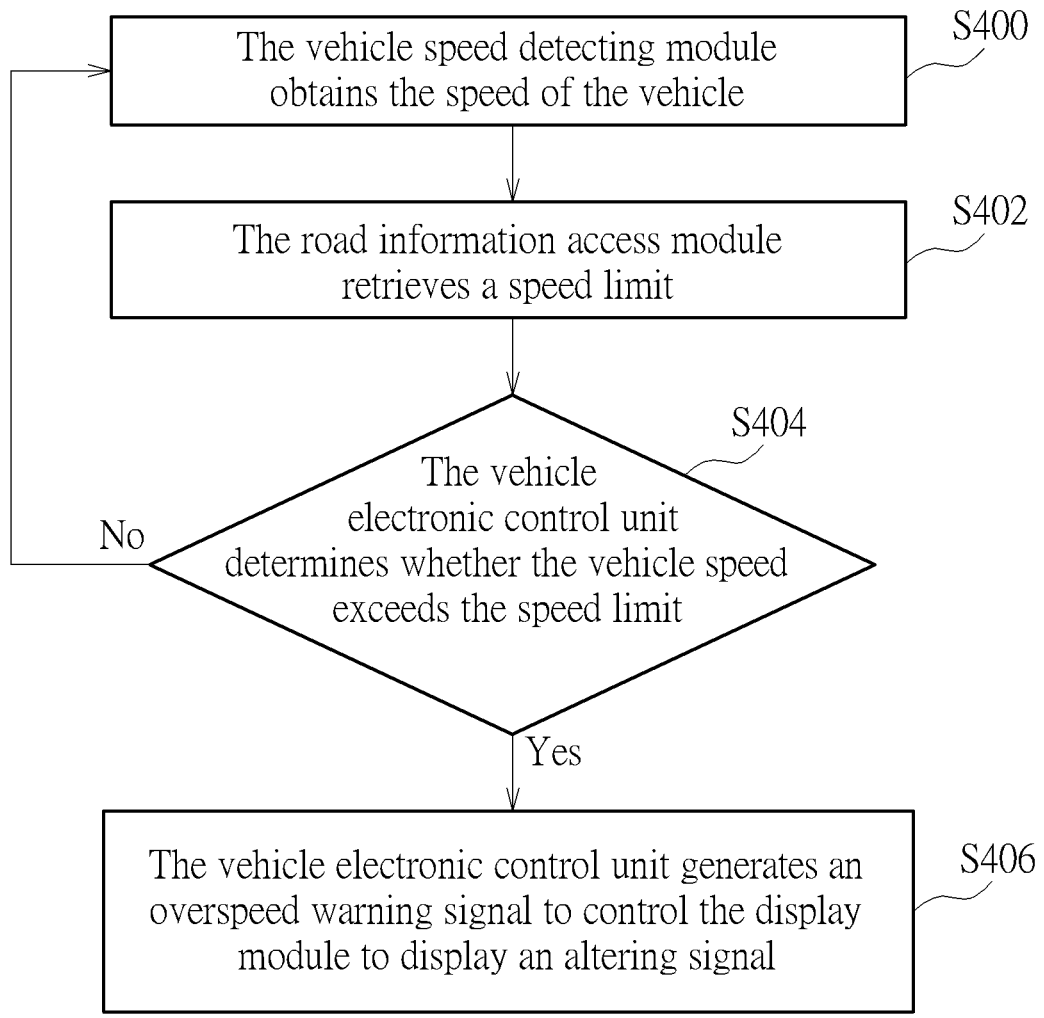
FIG. 15 is a flowchart of a method for providing high-speed alerts according to an embodiment of the present disclosure.

FIG. 15 is a flowchart for providing warnings (e.g., high-speed alerts) according to an embodiment of the present disclosure. As shown, the method includes the following actions.

In action S400, the vehicle speed detecting module 11 obtains the speed of the vehicle. For instance, when a vehicle 2000 is driving on a road section, the vehicle speed detecting module 11 detects or obtains the speed of the vehicle 2000.

In action S402, the road information access module 12 retrieves a speed limit. For instance, the road information access module obtains the current driving road section via a positioning system (e.g., global positioning system (GPS)), and retrieves a speed limit for the road section that the vehicle 2000 is currently driving on from a database where volumes of speed limits are stored thereon.

In action S404, the vehicle electronic control unit 13 determines whether the vehicle speed exceeds the speed limit. If the vehicle speed does not exceed the speed limit, the vehicle speed detecting module 11 keeps tracking the vehicle speed and the speed limit, i.e., the process returns to action S400. On the other hand, if the vehicle speed exceeds the speed limit, the action S406 is performed.

In action S406, the vehicle electronic control unit 13 generates an overspeed warning signal to control the display module 2 to display an alerting signal. In one embodiment, the display module 2 displays the alerting signal by flashing the display screen to draw the driver's attention even if the driver is not looking at the display screen.

Based on the above, a method for providing high-speed alerts is provided in the present disclosure. Instead of using sound or voice to warn drivers, believably an alerting signal more likely than not to have drivers' attentions. Since the alerting signal is displayed in the place perceptible by the driver, the driver could be easily aware of the overspeeding situation without being distracted from the road.

Figure 8:
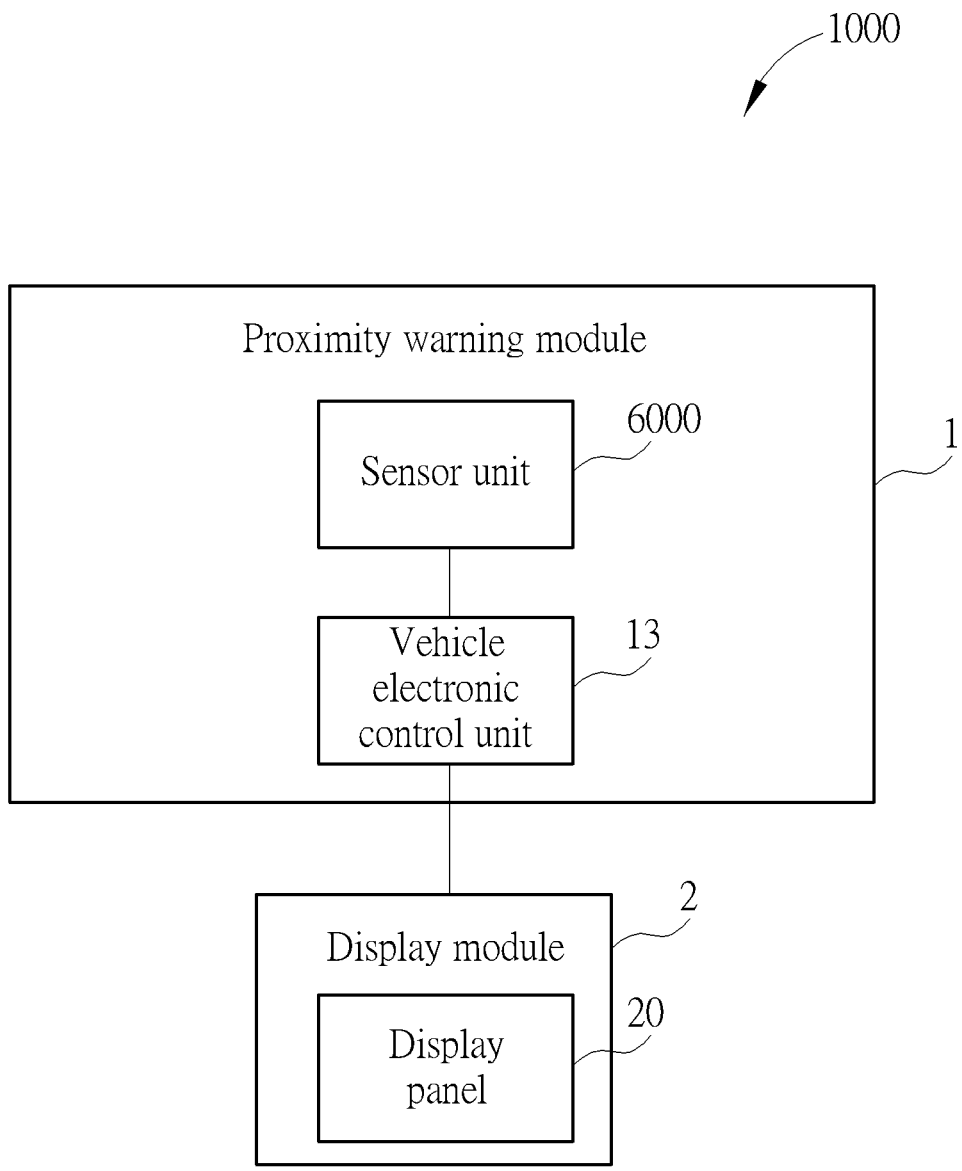
FIG. 8 is a block diagram of the warning system with a proximity alert feature according to an embodiment of the present disclosure.

In another implementation, the warning system 1000 of the present disclosure provides a proximity alert feature. In one embodiment, the warning system 1000 includes an advanced driver assistance system (ADAS). The warning system 1000 may be implemented in the vehicle 2000 as shown in FIG. 1 and FIG. 2. FIG. 8 is a block diagram of the warning system 1000 with a proximity alert feature according to an embodiment of the present disclosure. As shown in FIG. 8, the warning system 1000 includes a proximity warning module 1 and the display module 2. In one embodiment, the proximity warning module 1 may be an intelligent hardware device, such as a central processing unit (CPU), a microcontroller, or an ASIC. The proximity warning module 1 is configured to detect objects around the vehicle 2000 and generate a proximity warning signal accordingly. The display module 2 is coupled to the proximity warning module 1. The display module 2 is configured to displays a signal in a side area (as defined above) of the display module when the proximity warning signal is generated.

In some embodiments, the proximity warning module 1 includes at least one sensor unit 6000 and the vehicle electronic control unit 13. The vehicle electronic control unit 13 is coupled to the at least one sensor unit 6000 and the display module 2.

Figure 11:
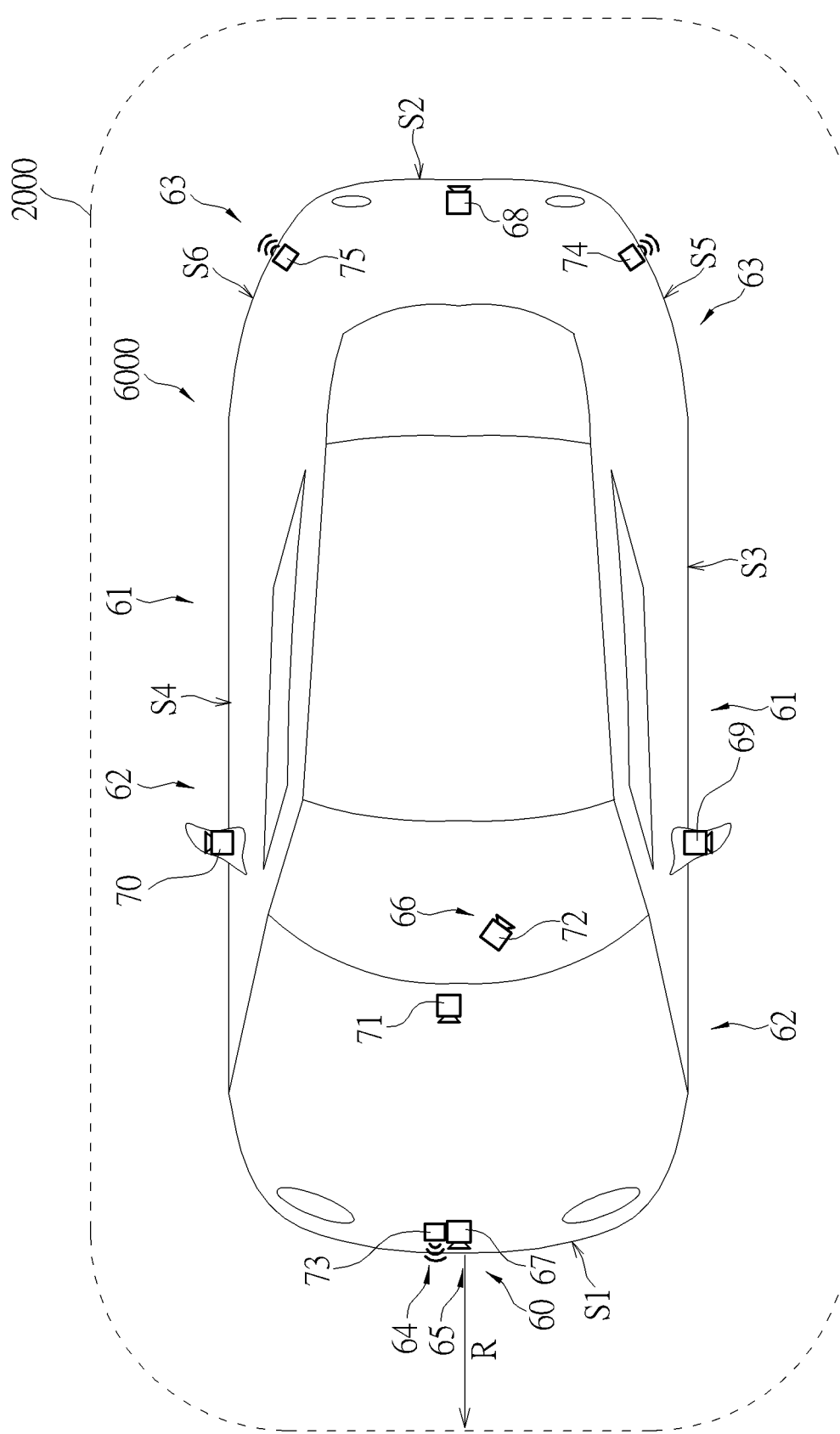
FIG. 11 is a schematic diagram of multiple sensor units disposed on the vehicle according to an embodiment of the present disclosure.
Figure 12:
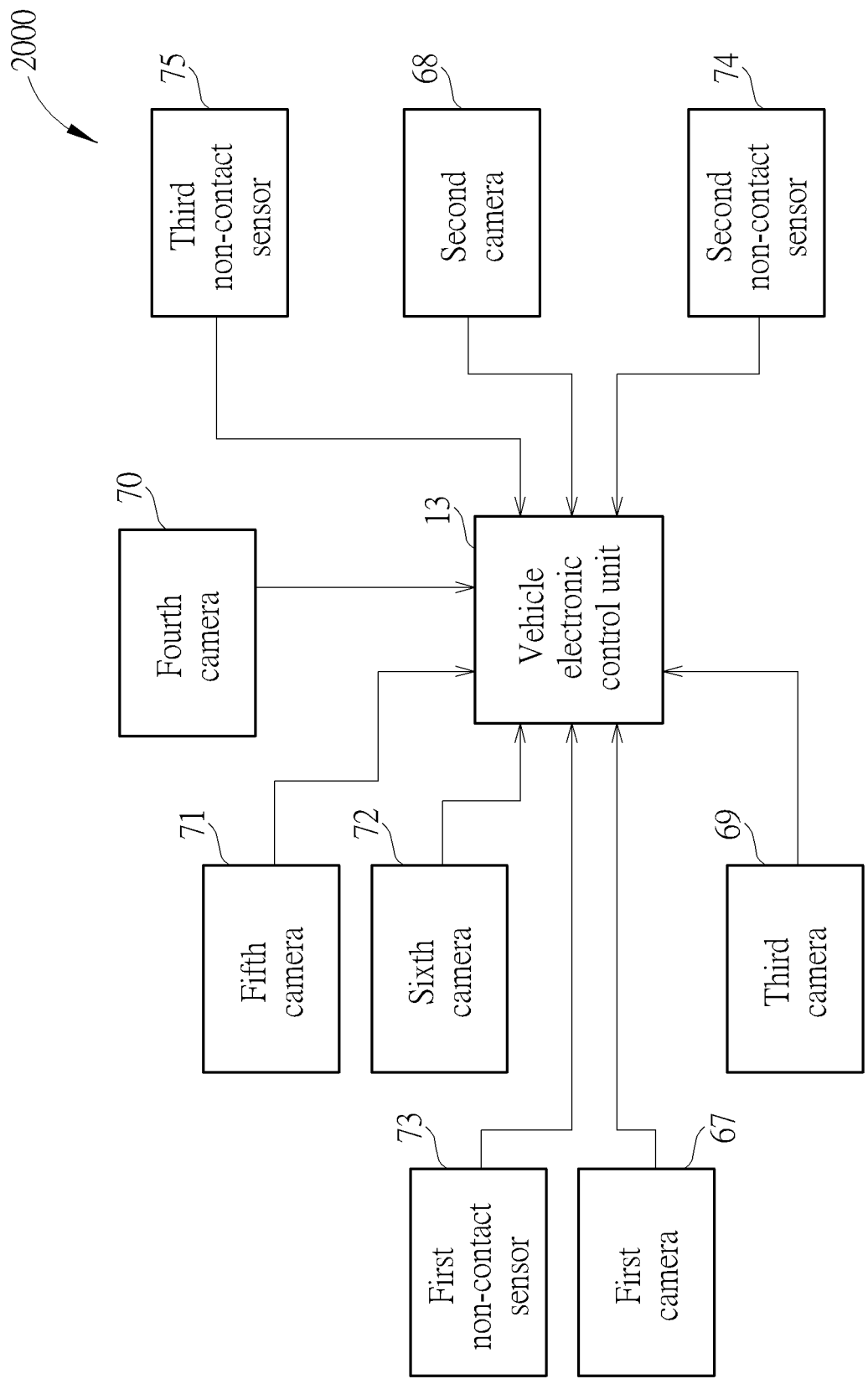
FIG. 12 is a block diagram of multiple sensor unit of the proximity warning module according to an embodiment of the present disclosure.

FIG. 12 is a block diagram of multiple sensor units of the proximity warning module 1 according to an embodiment of the present disclosure. In this embodiment, the sensor unit 6000 is selectively disposed on a periphery of the vehicle 2000. The sensor units include a first camera 67, a second camera 68, a third camera 69, a fourth camera 70, a fifth camera 71, a sixth camera 72, a first non-contact sensor 73, a second non-contact sensor 74 and a third non-contact sensor 75. FIG. 11 is a schematic diagram of multiple sensor units disposed on the vehicle 200 according to an embodiment of the present disclosure. As shown in FIG. 11, the first camera 67 and the first non-contact sensor 73 are disposed on the front side S1 of the vehicle body 2B. The second camera 68 is disposed on the rear side S2 of the vehicle body 2B. The third camera 69 is disposed on the left rear-view mirror 24. The fourth camera 70 is disposed on the right rear-view mirror 25. The second non-contact sensor 74 is disposed on the left-rear side S5 of the vehicle body 2B. The third non-contact sensor 75 is disposed on the right-rear side S6 of the vehicle body 2B. The fifth camera 71 and the sixth camera 72 are disposed in the cabin 21 facing the front road and the driver, respectively.

The sensor units, including the first camera 67, the second camera 68, the third camera 69, the fourth camera 70, the fifth camera 71, the sixth camera 72, the first non-contact sensor 73, the second non-contact sensor 74 and the third non-contact sensor 75, are coupled to the vehicle electronic control unit 13. In this embodiment, the first non-contact sensor 73, the second non-contact sensor 74 and the third non-contact sensor 75 may be, but not limited to, a radar module, a lidar module, a millimeter wave radar module. In some embodiments, the proximity warning module 1 with the sensor unit 6000 performs functions of the advanced driver assistance system (ADAS) to assist and alert the driver.

In one embodiment, the ADAS may include, but not limited to, a forward collision warning system (FCWS), a lane departure warning system (LDWS), a lane change decision aid system (LCDAS), a blind-spot detection system (BSDS), an adaptive cruise control (ACC), a pedestrian collision warning system (PCWS). The sensor unit 6000 of the proximity warning module 1 may execute functions of at least one of the FCWS, the LDWS, the LCDAS, the BSDS, the ACC and the PCWS. In other words, the sensor unit 6000 may include, but not limited to, a forward collision sensor assembly 60, a lane departure sensor assembly 61, a lane change sensor assembly 62, a blind-spot detection sensor assembly 63, an adaptive cruise sensor assembly 64, a pedestrian sensor assembly 65 and a driver sensor assembly 66. The forward collision sensor assembly 60, the lane departure sensor assembly 61, the lane change sensor assembly 62, the blind-spot detection sensor assembly 63, the adaptive cruise sensor assembly 64, the pedestrian sensor assembly 65 and the driver sensor assembly 66 includes at least one of the first camera 67, the second camera 68, the third camera 69, the fourth camera 70, the fifth camera 71, the sixth camera 72, the first non-contact sensor 73, the second non-contact sensor 74 and the third non-contact sensor 75.

Figure 9:
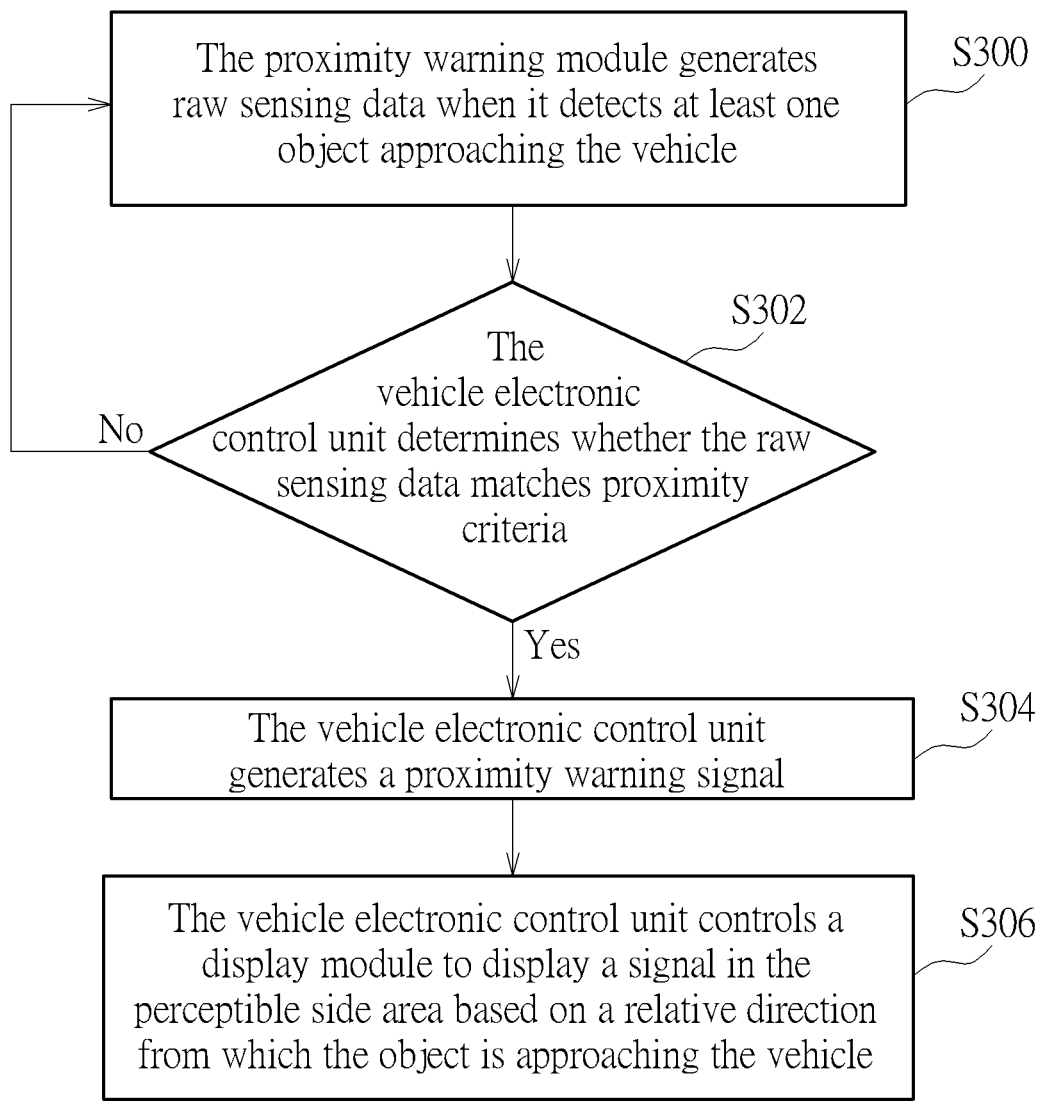
FIG. 9 is a flowchart of a method for providing proximity alerts according to an embodiment of the present disclosure.

FIG. 9 is a flowchart of providing proximity alerts according to an embodiment of the present disclosure. As shown, the method includes the following actions.

In action S300, the proximity warning module 1 generates raw sensing data when it detects at least one object approaching the vehicle 2000.

In action S302, the vehicle electronic control unit 13 determines whether the raw sensing data matches preset proximity criteria. If not matched, the proximity warning module 1 keeps detecting the at least one object, i.e., the process returns to action S300. Alternatively, if the proximity criteria are matched, the action S304 is performed.

In action S304, the vehicle electronic control unit 13 generates a proximity warning signal.

In action S306, the vehicle electronic control unit 13 controls a display module 2 to display a signal in the perceptible side area 203 based on a relative direction from which the object is approaching the vehicle 2000.

For instance, in action S300, when the vehicle 2000 is traveling on the road, the proximity warning module 1 detects that there is at least one object approaching the vehicle 2000. The object may be a moving vehicle, a pedestrian, an animal and so on. When the object enters the sensing range of the sensor unit 6000, the sensor unit 6000 generates the raw sensing data, and then transmits the raw sensing data to the vehicle electronic control unit 13. For example, when the object approaches and enters the sensing range of the sensor unit 6000 from a rear side of the vehicle 2000, the sensor unit 6000 disposed on the rear side of the vehicle 2000 senses the object and generates the raw sensing data. In one embodiment, the raw sensing data include a relative direction of the approaching object and a relative distance between the object and the vehicle 2000.

As mentioned above, since the raw sensing data includes the relative distance between the object and the vehicle 2000, in action 302, the vehicle electronic control unit 13 determines whether the raw sensing data matches the proximity criteria according to the relative distance. In one embodiment, the proximity criteria may include a warning threshold distance R. For example, when the vehicle electronic control unit 13 determines that the distance between the object to the vehicle 2000 (e.g., d) is greater than the warning threshold distance R (as shown in FIG. 11), the vehicle electronic control unit 13 determines that the raw sensing data does not match the proximity criteria, and then controls the proximity warning module 1 to continuously detect objects. On the other hand, if the vehicle electronic control unit 13 determines that the distance between the object and the vehicle 2000 is not greater than the warning threshold distance R, the vehicle electronic control unit 13 determines that the raw sensing data matches the proximity criteria, and then the vehicle electronic control unit 13 generates the proximity warning signal (as shown in action S304).

For example, assuming the object is approaching the front side S1 of the vehicle 2000 (as shown in FIG. 11), and entering into the sensing range of the sensor unit 6000. In this case, one of the sensor unit 6000 disposed on the front side S1 of the vehicle 2000 (e.g., the first camera 67 or the first non-contact sensor 73) generates raw sensing data. As a result, the raw sensing data may include an image captured by the first camera 67, and image processing may be further performed to obtain the relative distance of the object to the vehicle 2000. Alternatively, the raw sensing data may be obtained by performing a direct measurement of the relative distance through the first non-contact sensor 73. Manners to obtain the relative distance of the object to the vehicle 2000 of the present disclosure are not limited thereto, and categories of the raw sensing data depend on categories of the sensor unit 6000.

In some embodiments, when the object is within the warning threshold distance R, the vehicle electronic control unit 13 further determines a relative direction from which the object is approaching the vehicle 2000 based on the location when the sensor that senses the data is disposed. For example, as shown in FIG. 11, if the object is moving toward the front side S1 of the vehicle 2000 and entering the sensing range of the sensor unit 6000, one of the sensor unit 6000 disposed on the front side S1 of the vehicle 2000 (e.g., the first camera 67 or the first non-contact sensor 73) generates the raw sensing data. Based on the location of either the first camera 67 or the first non-contact sensor 73 that generating the data, the vehicle electronic control unit determines that the object is in the front side of the vehicle 2000.

Upon the detection of approaching objects, in some embodiments, the display module 2 displays a signal at the relative position of the side area 203. For instance, the vehicle electronic control unit 13 controls the display module 2 to display the signal in the upper display area 2030 based on the direction from which the object is approaching Similarly, a signal displayed in the lower display area 2031 of the side area 203 may indicate that an object is approaching the vehicle 2000 from the rear side S2 and the distance between the object and the vehicle 2000 is within the warning threshold distance R. In yet another example, a signal displayed in the left display area 2032 of the side area 203 indicates that an object is moving toward the vehicle 2000 from the left side S3 and the relative distance is within the warning threshold distance R. Further, a signal may be is displayed in the right display area 2033 to indicate that an object is on the right side S4 of the vehicle 2000 and the relative distance is within the warning threshold distance R.

In some embodiments, the relevant distance between the subject vehicle and the object will also be considered for the display of the signal on the display panel 20. For instance, the position of the signal moves closer to the central area as the object approaches to the vehicle. In one implementation, the distance between the signal and the central area is proportional to the relative distance between the object and the vehicle. In another implementation, the distance between the signal and the central area is not proportional to the relative distance between the object and the vehicle.

As such, instead of displaying the numerical data of the relative distance and/or the relative direction between the approaching object and the vehicle on the display panel 20, the display module 2 displays the signal on the side area 203 of the display panel 20. Therefore, the driver could easily recognize the relative distance and/or the relative direction between the approaching object and the vehicle according to the position of the signal on the display panel 20.

In one embodiment, the signal may be performed through color changes, adjustments of brightness, changes of shape and/or a flashing indicator.

It should be noticed that the proximity criteria of the present disclosure may include a warning threshold distance R and an estimated time of arrival. In one implementation, the estimated time of arrival indicates for how long that the object would bump into the vehicle 2000. The estimated time of arrival may be determined by the relevant distance and the velocities of the object and the vehicle 2000. In one implementation, a relative velocity of the object to the vehicle 2000 is calculated by the vehicle electronic control unit 13. In another implementation, the relative velocity is detected by the sensor unit 6000. For example, when the relative distance between the object and the vehicle 2000 is 20 meters and the relative velocity of the object to the vehicle 2000 is 10 meters per second, the estimated time of arrival is 2 seconds. Accordingly, the vehicle electronic control unit 13 determines a proximity level based on the estimated time of arrival. For example, if the estimated time of arrival is less than 3 seconds, the proximity level is defined as proximity level 3. If estimated the time of arrival is greater than or equal to 3 seconds but less than 5 seconds, the proximity level is defined as proximity level 2. If the estimated time of arrival is greater than or equal to 5 seconds but less than 7 seconds, the proximity level is defined as proximity level 1. The scales of the estimated time of arrival of the proximity level may be adjusted based on factors including road regulations, road conditions, climate, seasons and so on.

In addition, the degree of proximity level may be represented by different colors. For example, a red-pattern signal indicates that the proximity level is 3; a yellow-pattern signal refers to the proximity level 2, while a green-pattern signal represents that the proximity level is 1. Thus, by appreciating the color, the driver could be easily aware of the degree of the proximity level.

In addition, the present disclosure may adopt the proximity levels in accordance with the warning threshold distance R as the proximity criteria as well. FIG. 10 is a schematic diagram of a truth table including variables of a proximity level 3, a proximity level 2, and a proximity level 1. The variables include the warning threshold distance R and the estimated time of arrival threshold (e.g., 3, 5, 7).

FIG. 10 illustrates relations of the proximity levels versus the estimated time of arrival, and the relative distance between an object and the vehicle 2000 versus the warning threshold distance R. In this implementation, the proximity levels include three degrees: the proximity level 3 (denoted by level-3), the proximity level 2 (denoted by level-2), and the proximity level 1 (denoted by level-1). Further, the estimated time of arrival is denoted by t, the relative distance between an object and the vehicle 2000 is denoted by d, and the warning threshold distance is denoted by R. In the truth table, the value 1 indicates true (e.g., a proximity level is triggered), and the value 0 indicates false (e.g., a proximity level is not triggered).

In this embodiment, both the relative distance and the estimated time of arrival are considered to determine in what degree the proximity level is. For example, as shown in FIG. 10, if the estimated time of arrival t is less than 3 seconds, under such circumstance the relative distance between the approaching object and the vehicle 2000 is less relevant because there is a high probability that the approaching object will collide with the vehicle 2000 within 3 seconds and there is no sufficient time to react to avoid the accident. In this case, the proximity level is determined to be level-3, and consequently, for instance a red-pattern signal may be displayed on the display module 2 to indicate the urgency.

In another example, assuming the estimated time of arrival t is greater than 7 seconds and the relative distance d between the object and the vehicle 2000 is less than or equals to the warning threshold distance R. Although it does not seem the approaching object will be close to the vehicle 2000 in any soon from the perspective of time, the risk of a collision may still exist if the relative distance d is not great enough. In such scenario, the proximity level is determined to be level-1. Thus, the display module 2 displays, for instance a green-pattern signal to indicate the less urgent situation. The other conditions illustrated in FIG. 10 may be derived accordingly and related descriptions are omitted herein for simplicity. It should be noticed that the proximity criteria illustrated in the truth table in FIG. 10, combining the estimated time of arrival t and the warning threshold distance R are merely provided for illustrative purposes. Other factors may further be considered when skilled persons design similar truth tables.

As such, the present disclosure provides several warning systems and methods for providing warnings. When a warning signal (e.g., the proximity warning signal or the over-speed warning signal) is generated, the warning system of the present disclosure controls the display module to display a signal on the side area or controls the display module to display an alerting signal to draw drivers' attention. Since the signal is displayed in the place perceptible by the driver, the driver could be easily aware of the warning without turning the eyesight from the road. Furthermore, the position where a signal may be displayed depends on the relative direction where an object approaches the subject vehicle. By adopting the information visualization techniques proposed in the present disclosure, the driver could understand the warning information at a glance. Under such design, the driver may be able to react more immediately and instinctively. Last but not least, a proximity level is determined based on several factors. The factors may include a relative distance between the approaching object and the subject vehicle, and/or an estimated time of arrival of the object to the vehicle. Based on the determined proximity level, a pattern with different color is displayed to indicate the degree of urgency of the current condition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A warning system implemented in a vehicle, comprising:
   a proximity warning module configured to detect at least one object approaching the vehicle and generate a proximity warning signal, wherein the proximity warning signal comprises a relative direction of the at least one object to the vehicle and a relative distance between the at least one object and the vehicle; and
   a display module configured to display a signal in a side area of the display module perceptible by a driver when the proximity warning signal is generated, wherein a position of the signal is determined based on the relative direction of the at least one object to the vehicle and the relative distance between the at least one object and the vehicle, and the display module is further configured to display a proximity level of the object;
   wherein the display module comprises a display panel having an active display area, the active display area comprises a central area and the side area, and a distance between the signal and the central area is proportional to the relative distance between the at least one object and the vehicle; the proximity level is determined according to the relative distance between the at least one object and the vehicle and an estimated time of arrival of the at least one object would bump into the vehicle; when the estimated time of arrival is less than a first threshold, the proximity level is of a first degree; when the estimated time of arrival is not less than the first threshold and the relative distance is not greater than a second threshold, the proximity level is of a second degree; when the estimated time of arrival is not less than the first threshold and the relative distance is greater than the second threshold, the proximity level is of a third degree, the first degree indicates an urgency not less than the second degree, and the second degree indicates the urgency greater than the third degree.

2. The warning system of claim 1, wherein the proximity warning module comprises:
   at least one sensor unit configured to generate raw sensing data, wherein the raw sensing data comprising the relative direction of the at least one object to the vehicle and the relative distance between the at least one object and the vehicle; and
   a vehicle electronic control unit configured to generate the proximity warning signal in response to the raw sensing data.

3. The warning system of claim 1, wherein the proximity warning signal is generated according to the proximity level.

4. The warning system of claim 1, wherein the signal displayed in the side area of the display module is performed through color changes, adjustments of brightness, changes of shape, or a flashing indicator.

5. The warning system of claim 1, wherein the display module further comprises:
   a plurality of light emitting units arranged in the side area and configured to display the signal.

6. The warning system of claim 5, wherein the plurality of light emitting units are arranged in a ring.

7. The warning system of claim 5, wherein the plurality of light emitting units are disposed corresponding to the relative direction of the at least one object to the vehicle.

8. The warning system of claim 1, wherein the display module is implemented in a vehicle instrument cluster, a central console panel, a rear-view display or a head-up display.

9. A method for providing warnings, comprising:
   detecting at least one object approaching a vehicle and generate raw sensing data, wherein the raw sensing data includes a relative direction of the at least one object to the vehicle and a relative distance between the at least one object and the vehicle;
   generating a proximity warning signal according to the raw sensing data, wherein the proximity warning signal comprises the relative direction of the at least one object to the vehicle and the relative distance between the at least one object and the vehicle; and
   displaying a signal in a side area of a display module perceptible by a driver when the proximity warning signal is generated, wherein a position of the signal is determined based on the relative direction of the at least one object to the vehicle and the relative distance between the at least one object and the vehicle, and a proximity level of the object is further displayed;
   wherein the display module comprises a display panel having an active display area, the active display area comprises a central area and the side area, and a distance between the signal and the central area is proportional to the relative distance between the object and the vehicle;
   wherein the proximity level is determined according to the relative distance between the at least one object and the vehicle and an estimated time of arrival of the at least one object would bump into the vehicle; when the estimated time of arrival is less than a first threshold, the proximity level is of a first degree; when the estimated time of arrival is not less than the first threshold and the relative distance is not greater than a second threshold, the proximity level is of a second degree; when the estimated time of arrival is not less than the first threshold and the relative distance is greater than the second threshold, the proximity level is of a third degree, the first degree indicates an urgency not less than the second degree, and the second degree indicates the urgency greater than the third degree.

10. The method of claim 9, wherein the proximity warning signal is further generated according to the proximity level.

* * * * *